United States Patent
Galasso

(10) Patent No.: US 7,332,675 B2
(45) Date of Patent: Feb. 19, 2008

(54) ELBOW ASSEMBLY FOR USE WITH DIVIDED RACEWAY HAVING T-SHAPED BASE

(75) Inventor: Marc Galasso, Beacon Falls, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 11/477,989

(22) Filed: Jun. 29, 2006

(65) Prior Publication Data

US 2008/0000669 A1    Jan. 3, 2008

(51) Int. Cl.
H02G 3/04    (2006.01)
(52) U.S. Cl. .................... 174/97; 174/95; 174/101; 174/68.1; 138/162; 220/340
(58) Field of Classification Search .................. 174/95, 174/97, 99 R, 101, 68.1, 68.3, 135; 138/162, 138/92; 220/340
See application file for complete search history.

(56) References Cited

U.S. PATENT DOCUMENTS

| 5,469,893 | A | * | 11/1995 | Caveney et al. ............ 138/162 |
| 7,045,707 | B1 | | 5/2006 | Galasso ....................... 174/48 |
| 2006/0117684 | A1 | | 6/2006 | Picard et al. .................. 52/239 |
| 2006/0151209 | A1 | | 7/2006 | Makwinski et al. ........ 174/481 |

* cited by examiner

Primary Examiner—Dhiru R. Patel
(74) Attorney, Agent, or Firm—McCormick Paulding & Huber LLP

(57) ABSTRACT

A divided raceway has runs that must traverse a corner in a wall structure. A raceway elbow assembly has an L-shaped base with mutually perpendicular leg portions adapted to abut the wall at that corner. Divider walls are carried by these flat leg portions, but allow flexing of the elbow leg portions as a result of a V-shaped gap between the divider walls at the vertex of the L-shaped elbow, or as a result of the divider wall overlapping one another in this region.

15 Claims, 4 Drawing Sheets

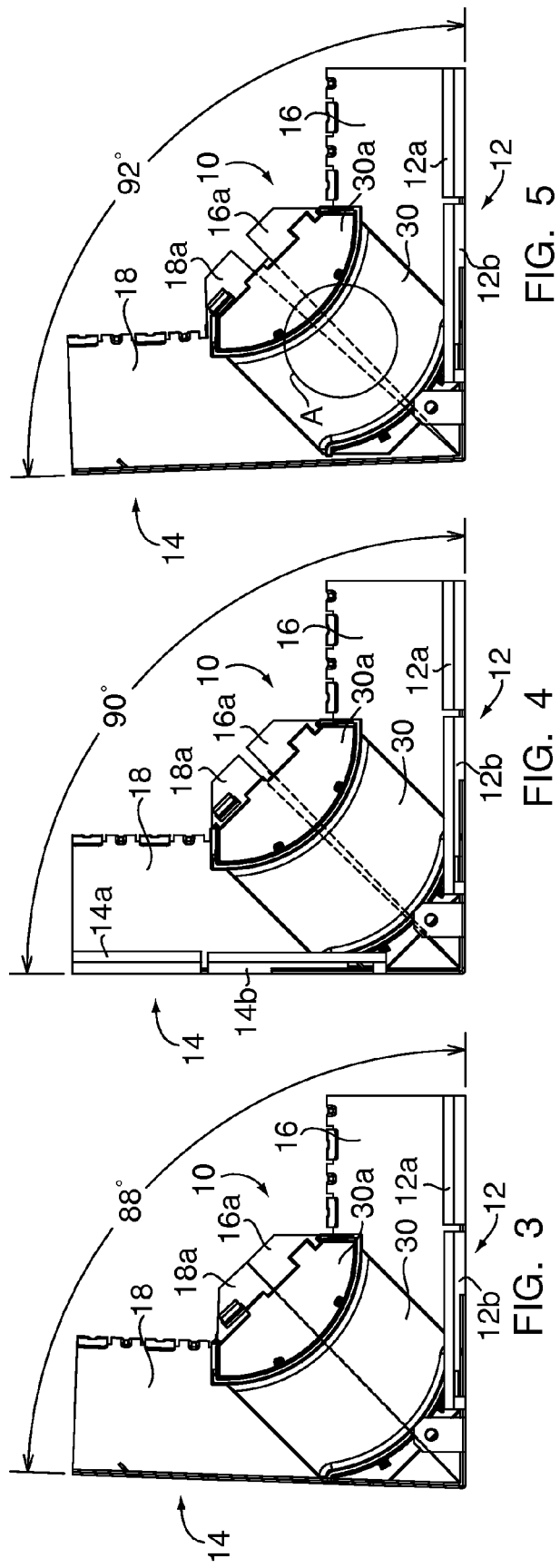

US 7,332,675 B2

ELBOW ASSEMBLY FOR USE WITH DIVIDED RACEWAY HAVING T-SHAPED BASE

CROSS REFERENCE TO RELATED APPLICATION

This application incorporates by reference a commonly assigned application entitled Modular Raceway With Base and Integral Divider, Ser. No. 11/035,477, filed Jan. 13, 2005 now U.S. Pat. No. 7,262,371. The present application comprises an improvement to that disclosure with emphases on a unique corner or elbow assembly for such a raceway configuration. Also incorporated by reference is application Ser. No. 11/296,903 filed Dec. 8, 2005 entitled Modular Raceway. Another related application is Ser. No. 11/111,578, issued as U.S. Pat. No. 7,045,707 on May 16, 2006 to the inventor herein.

Summary of Application Ser. No. 11/035,477, Filed Jan. 13, 2005

The relevant features of the above-identified commonly assigned application can be summarized as follows. The raceway components comprise a T-shaped raceway base having a forwardly projecting divider wall or web, the web having downwardly and upwardly directed flanges for receiving marginal edge portions of L-shaped raceway covers. Each of the L-shaped covers has a socket-defining portion adapted to be received by the top and bottom marginal edges of the raceway base, adjacent to the wall structure to which the raceway is mounted. The raceway base components can be mounted to a wall structure with gaps there-between, and coupling elements used to span this gap. The L-shaped covers and the coupling elements define continuously contained wireways across such gaps.

SUMMARY OF THE INVENTION

The present invention relates to an elbow assembly for use between mutually perpendicular raceway runs, and more particularly for use at a corner of a wall structure where the T-shaped raceway base components must be coupled to one another for running power cables and data/communication cables around a corner that might be 90 degrees or might be somewhat off 90 degrees.

In its preferred form, the elbow assembly includes a generally L-shaped elbow base, which complements the T-shaped raceway base shape, and which includes mutually perpendicular leg portions that are flat and that are alignable with a flat portion of the T-shaped base that abuts the wall structure.

The L-shaped elbow base has flat leg portions integrally connected to one another, and each leg portion further includes a divider wall alignable with the projecting web of each T-shaped raceway base that runs along each of the mutually perpendicular walls.

The divider walls are secured to these flat elbow base leg portions, but are not secured to one another, so that the flat mutually perpendicular leg portions can be flexed relative to one another, through an angle of at least +3 degrees relative a nominal 90 degree angle (87-93 degrees).

Preferably, the elbow base of the present invention is fabricated so that these elbow base divider walls are not connected to one another, and only the vertex or corner between the elbow base leg portions is integrally connected. Thus, one side of the L-shaped elbow base can be flexed relative to the other side for accommodating off square walls (i.e., not perpendicular). The flat portions of the elbow base leg portions are more easily bent because of slots provided at the vertex or corner to facilitate such flexing.

The L-shaped elbow base assembly leg portions further include in-turned marginal edge flanges for receiving both an elbow base cover designed to fit the L-shaped base, and to receive as well the raceway cover components associated with the mutually perpendicular modular raceway runs provided on the generally perpendicular walls of the structure to be fitted with an elbow assembly constructed in accordance with the present invention.

BRIEF DESCRIPTION OF THE DRAWINGS

FIG. 3 is a side view of the raceway elbow base of FIG. 1, the leg portions being oriented at 88 degrees relative to one another.

FIG. 4 is similar to FIG. 3, but illustrates the leg portions of the L-shaped base oriented at 90 degrees with respect to one another.

FIG. 5 is similar to FIGS. 3 and 4, but illustrates the leg portions oriented in an angle slightly greater than 90 degrees.

DETAILED DESCRIPTION

Figure 1:
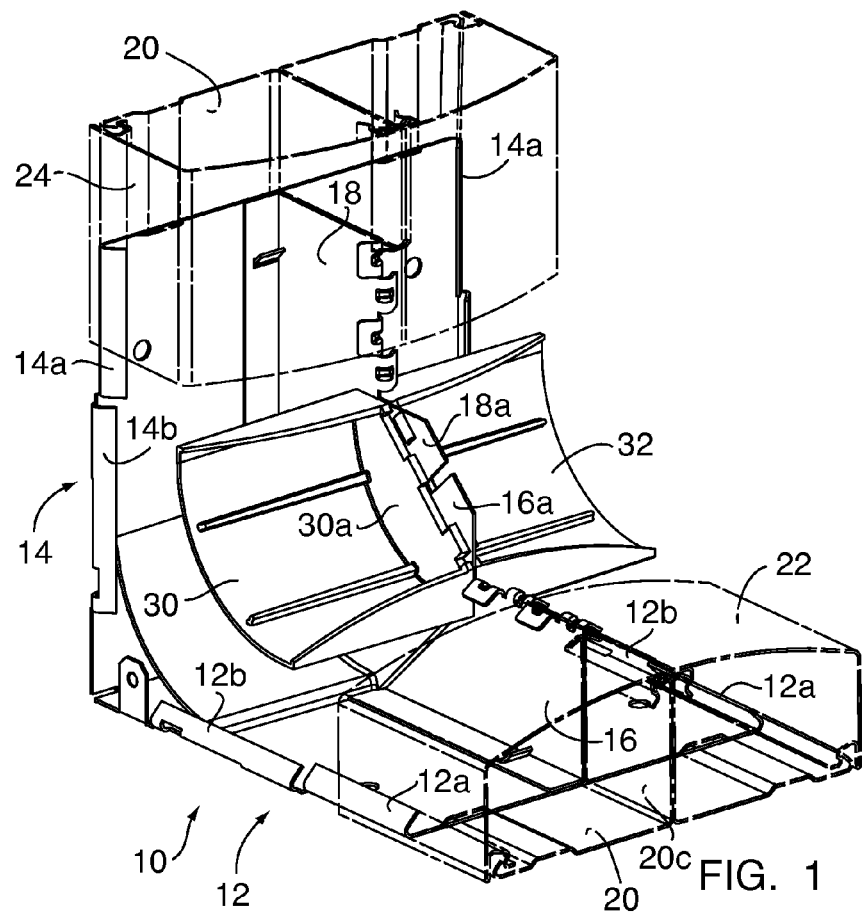
FIG. 1 is a perspective view showing an elbow base in accordance with the present invention for installation at an internal corner of a wall structure, the raceway runs leading into and out of that corner being illustrated in phantom lines.

Turning now to the drawings in greater detail, FIG. 1 illustrates in phantom lines two mutually perpendicular raceway runs, each of which raceway runs comprises a generally T-shaped base 20, and upper cover 22 plus lower cover 24. Thus, each raceway run defines separate first and second wireways that are individually accessible by removal of individual upper and lower covers 22 and 24, respectively.

The raceway base 20 has upper and lower marginal edges associated with the upper and lower wireways, respectively, these edges defining in-turned lips similar to those provided at the outer segments of the generally L-shaped raceway elbow base 10 (to be described).

As described and shown in the commonly owned patent application Ser. No. 11/296,903, entitled Modular Raceway, one way to fabricate a raceway elbow base is from generally flat brackets butted against one another at a corner (either internal or external) of a wall structure as described in that commonly assigned application.

In a preferred embodiment, described in the first mentioned application, coupling elements are provided between adjacent or spaced raceway base components, said coupling elements comprising inserts provided within the wire ways themselves, rather than brackets first mounted to the wall structure. The present disclosure provides for such coupling elements, in a unique elbow corner assembly having a configuration that takes a form determined by whether the elbow assembly is provided at an internal or an external corner of a wall structure. FIGS. 1-5 illustrate an elbow corner assembly adapted for use at an internal corner, whereas FIGS. 8-11 illustrate an elbow corner assembly adapted for use with an external wall structure corner.

Still with reference to the prior co-pending application Ser. No. 11/035,477, summarized above, the T-shaped raceway base configuration is carried over to the internal and external elbow base assemblies of the present invention, outer segments of the L-shaped leg portions of the raceway base 10 having the same cross-section as the cross-section of the T-shaped base, allowing the raceway covers (both upper and lower covers 22 and 24) to overlap these outer segments of the L-shaped elbow base 10. More particularly, the leg portions 12 and 14 of the elbow base 10 include outer segments 12a and 14a that cooperate with the adjacent raceway base, that is preferably butted to the elbow base 10, so that the covers 20 and 24 can be secured both to the raceway base and the elbow base in overlapping relationship to one another. Thus, the elbow base 10 includes a central spine or web portion, 16 and 18, that comprise separate components welded or secured by tabs to the flat plate portion of the elbow base legs 12 and 14.

It is a feature of the present invention that these web portions 16 and 18 associated with the elbow base leg portions 12 and 14, respectively, are not connected to one another, but are instead connected only to their associated elbow base leg portions.

As best shown in FIG. 5, the leg portions 12 and 14 are oriented at an angle greater than 90 degrees, to accommodate a wall structure corner that is beyond perpendicular, a gap is defined between the inner end portions of these webs 16 and 18 as indicated generally by the encircled area designated by A in FIG. 5.

In FIG. 4, these inner end portions of the webs 16 and 18 will also define a gap such as that shown in FIG. 5, but the gap is of smaller size. In the same vein, FIG. 3 illustrates an off square corner of less than 90 degrees for the leg portions 12 and 14, the limit on the low side of the angle being dictated by the butting together of these inner end portions of the webs 12 and 14.

It is a feature of the present invention that the upper and lower wireways defined in the mutually perpendicular raceway runs be continued through the internal elbow base 10, and in order to accommodate the rather generous radius requirements of fiber optic cable in particular, the elbow base 10 is preferably fitted with radiused inserts 30 and 32, each of which inserts 30 and 32 is designed to form a continuation of the wireway provided in the upper and lower raceway runs, respectively.

These radiused inserts 30 and 32 are of polymeric material, and are similar to one another, the only difference being in the configuration of the center portions 30a,32a, which are oriented parallel to the web portions 16 and 18 of the raceway base 10, and which have tabs that are adapted to be received in openings provided for this purpose in these web portions 16 and 18 associated with the leg portions 12 and 14, respectively, of the elbow base 10.

More particularly, the web portion 16 of leg 12 includes an inner end portion 16a that is slightly spaced from its corresponding end portion 18a of the other web 18 associated with the other leg 14 of the elbow base 10. The gap provided between these web inner end portions 16a and 18a is shown to best advantage in FIGS. 4 and 5, and was referred to previously with reference to detail A of FIG. 5.

Still with reference to the radiused inserts 30 and 32, each insert can be seen to have a generally U-shaped cross section, the legs of the U defining arcuate walls for accommodating the wires or cables therebetween, the cable being provided in the raceway runs and therefore passing through the raceway elbow base 10. It will be apparent that the insert inner wall 30a has a portion that overlies the web portions 16 and 18, and more particularly the inner end portions thereof 16a and 18a, respectively, that are closed by the wall 30a of the radiused insert 30.

Figure 2:
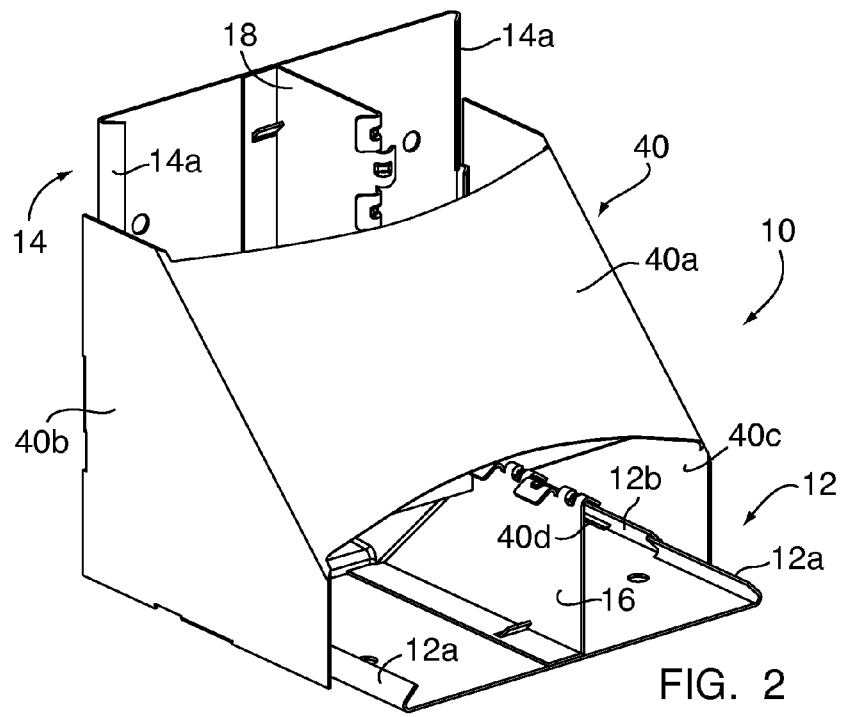
FIG. 2 is a view of the elbow base of FIG. 1, with an internal base corner cover provided (the raceway runs being eliminated from this view for clarity).

In further accordance with the present invention, and as best shown in FIG. 2, the L-shaped corner base 10 is provided with a corner cover 40 that is so shaped as to fit over the raceway covers 22 and 24 associated with each of the mutually perpendicular raceway runs described previously with reference to FIG. 1. The cover 40 is also generally U-shaped having a front wall 40a conforming to the raceway cover configuration so that this front wall 40a will overlie these raceway covers 22 and 24. Top and bottom walls 40b and 40c of the raceway cover 40 form the legs of the U-shaped cover 40 and are provided with bent flanges 40d that are received behind the marginal edges 12b, 14b of the elbow base 10 in much the same manner as the raceway covers are themselves provided on the raceway base flanges. The reader is referred to the aforementioned co-pending application Ser. No. 11/035,477 for a more complete description of this feature.

Turning next to a detailed description of FIGS. 6-11, an external corner elbow base 50 is provided for providing at an external wall structure corner, and is designed to abut or otherwise be aligned with mutually perpendicular raceway runs similar to those described with reference to FIG. 1, having a T-shaped configuration similar to that described previously with reference to the internal corner base 10.

Figure 6:
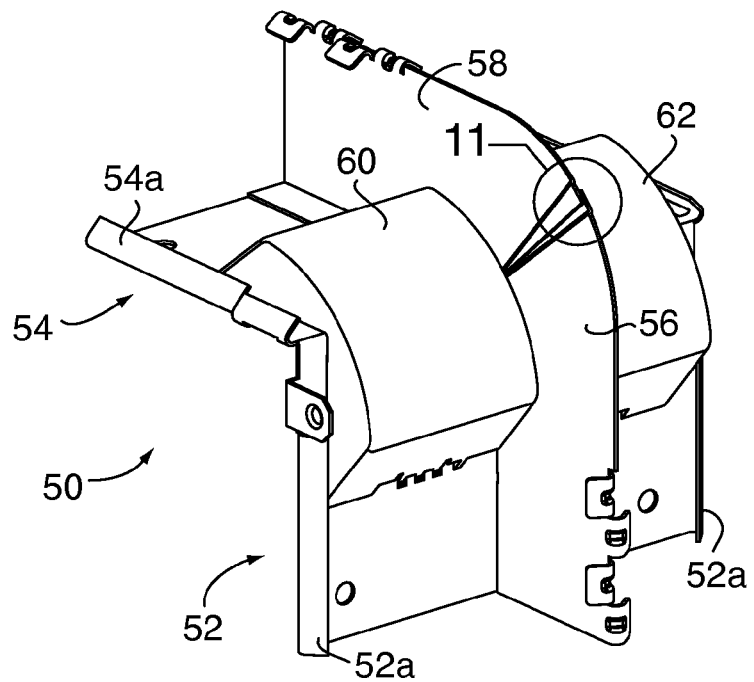
FIG. 6 shows an alternative embodiment of the present invention, and illustrates an adaptation of the invention to an external corner of a wall structure.
Figure 7:
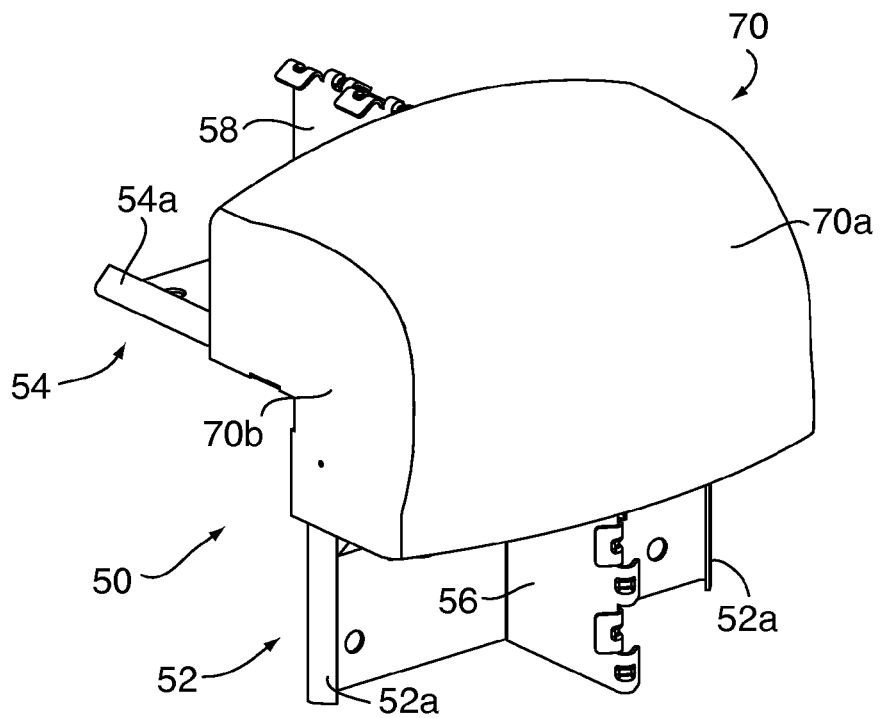
FIG. 7 is a view similar to FIG. 6, but illustrates an external elbow assembly cover portion in place on the external elbow base of FIG. 6.
Figure 10:
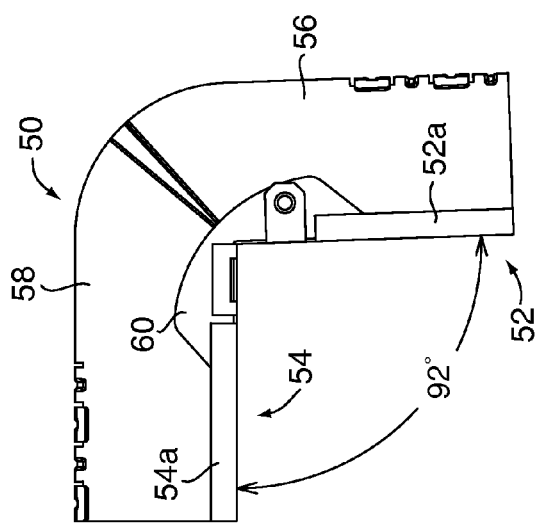
FIG. 10 is a view similar to FIGS. 8 and 9, but shows the L-shaped raceway base with the leg portions oriented at slightly greater than 90 degrees.
Figure 9:
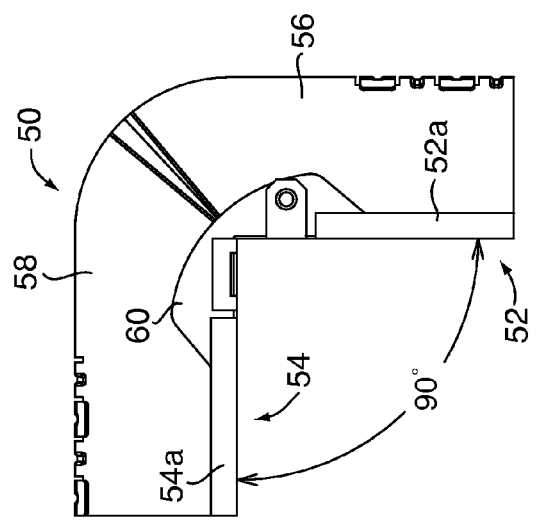
FIG. 9 is a view similar to FIG. 8, but shows the leg portions oriented at 90 degrees.

The raceway elbow base 50, as in the previous embodiment, is designed for use between mutually perpendicular divided raceway runs at a corner of the wall structure, the corner in FIG. 6 being an external corner. The elbow assembly includes an L-shaped elbow base 50 having generally perpendicularly oriented leg portions 52 and 54 that are flat and alignable with the generally perpendicular walls defining the wall structure corner. These leg portions 52 and 54 are alignable as well with the generally perpendicular raceway runs (not shown). This L-shaped elbow base 50 defines a corner or vertex integrally connecting these leg portions, and each of the leg portions 52 and 54 further include divider walls 56 and 58, respectively, that are joined to the leg portions but not to one another so that the mutually perpendicular flat leg portions can be flexed relative to one another from a nominal 90 degree relationship to conform to wall structure corners that do not form a 90 degree corner, but instead define a corner which is off square slightly.

Figure 11:
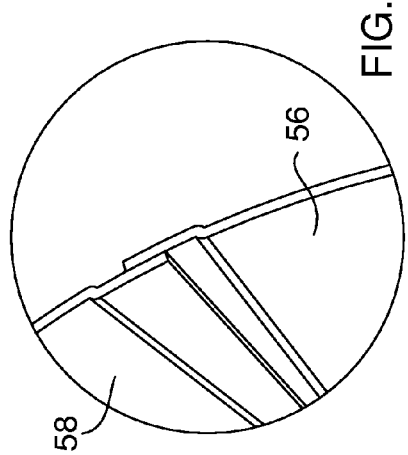
FIG. 11 is a detailed view of the overlapping portions of the divider wall provided in the raceway base of FIGS. 6-10 that allow movement of the leg portions between the various positions depicted in FIGS. 8, 9 and 10.
Figure 8:
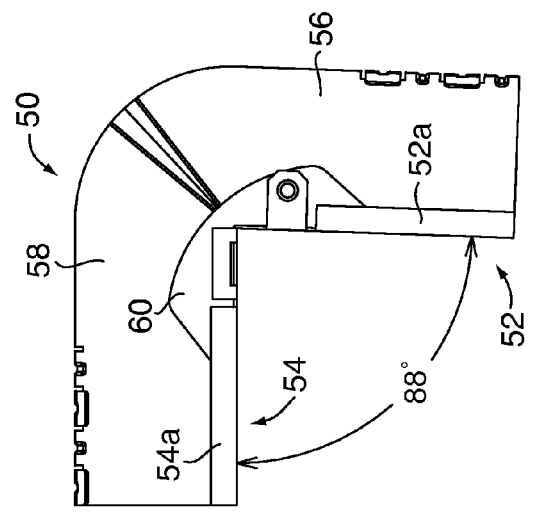
FIG. 8 is a side view of the FIG. 6 external elbow corner assembly with the leg portions oriented at slightly less than 90 degrees.

These divider walls or web portions 56 and 58 overlap one another in the region designated generally at 11 in FIG. 6 and shown in detail in FIG. 11 so as to allow movement or flexing of the elbow base leg portions 52 and 54, thereby accommodating off square wall structure corners.

As in the previously described embodiment, radiused inserts 60 and 62, but shown in FIG. 6, are provided in the upper and lower wireways of the elbow base, each insert having a generally U-shape, and the legs of the U defining tabs that are in turn received in slots provided for this purpose in the raceway base divider wall 56 and 58, to anchor the raiused inserts in the position shown, providing a generous radius of curvature for the cables running through the upper and lower wireways.

In the embodiment of FIGS. 6-11, the plastic radiused insert is not required to define the outside of the corner, as the elbow assembly is fitted with an external base cover 70 that serves this purpose as a result of its concave internal contour. As with the previously described base cover 40, associated with the internal corner assembly 10, flat upper and lower surfaces 70b cooperate with the curved external contour 70a to provide continuations of the wireways in the mutually perpendicular raceway runs. The raceway covers (not shown) are anchored to both the raceway base and the outer segments 52a, 54a of the elbow base flanges 52a, 54a.

The elbow base in both embodiments can be mounted directly to a T-shaped raceway base such as described in the above identified commonly assigned patent application, or can accommodate gaps between the elbow base and the T-shaped raceway base, utilizing raceway coupling elements as described in said application. The raceway base has a central divider wall 20c that is aligned with the projecting webs 16 and 18 of the elbow base 10.

What is claimed is:

1. A raceway elbow assembly for use between generally perpendicular divided raceway runs at a corner of a wall structure, said elbow assembly including:

an L-shaped elbow base having generally perpendicularly oriented leg portions that are flat, and that are alignable with the generally perpendicular walls defining the wall structure corner, said L-shaped elbow base flat leg portions being connected to one another at a vertex thereof, and each leg portion further including a divider wall alignable with dividers provided in the divided raceway runs respectively, said divider walls of said elbow base being secured to their respective elbow base leg portions, but not secured to one another, so that the mutually perpendicular flat leg portions can be moved relative to one another, at said vertex from a nominal 90 degree relationship, to conform to a wall structure corner that forms a corner greater or lesser than 90 degrees.

2. The combination according to claim 1, wherein said elbow base leg portions have outer segments with a cross-section that conforms to that of the raceway runs.

3. The combination according to claim 2, further including a raceway elbow cover component having portions adapted to overlie raceway covers provided as part of said raceway runs, and said elbow cover component further including marginal edges adapted to be received by flanges defined between the vertex of the elbow base and said outer segments of said elbow base leg portions.

4. The combination according to claim 2, further characterized by coupling elements received by one or both raceway runs, and by said elbow base assembly to accommodate a gap between the raceway run and said elbow assembly, said coupling elements having cross sectional shapes that fit snugly into the elbow leg portion outer segments.

5. The combination according to claim 4, wherein said coupling elements are of L-shape cross section, and each element having one side of the L abutting said divider to provide a continuous wall from the raceway through the coupling element to said elbow corner assembly.

6. The combination according to claim 1, further including at least one radiused insert that is of curved contour to define a continuous wireway for one wireway of said raceway runs, through said elbow assembly between the generally perpendicular raceway runs at said wall structure corner.

7. The combination according to claim 6, wherein said divider walls of said elbow base define a gap, which gap is closed by said radiused insert.

8. The combination according to claim 6, wherein a second radiused insert defines a continuous wireway for the other of said raceway run wireways.

9. The combination according to claim 6, wherein said radiused insert has a U-shape with the base of the U-shape defining said curved contour, and at least one of the legs of the U-shape having tabs that are received in slots defined for them in said elbow base.

10. The combination according to claim 1, wherein said divider walls of said elbow base defines offset and overlapping segments that allow movement of said leg portions to accommodate a wall structure corner that forms a corner other than 90 degrees.

11. A raceway elbow assembly for use at a corner of a wall structure between divided raceways having a divider wall running into the corner, said elbow base assembly comprising:

an elbow base with generally flat wall engaging leg portions connected to one another at a vertex, and oriented generally perpendicular to one another, and located at the wall structure corner, each flat wall engaging leg portion having a projecting web joined to the elbow base and alignable with the divider wall in the raceways running into said wall structure corner, said projecting webs being free to move relative to one another so that said flat wall engaging portions will accommodate off square wall structure corners.

12. The raceway elbow assembly of claim 11 wherein said flat wall engaging portions are integrally connected to one another along an axis (vertex) at the wall structure corner.

13. The raceway elbow assembly of claim 11 wherein said projecting webs divide the base assembly into two wireways that communicate with divided raceways running into the wall structure corner, and at least one radiused insert provided on said webs to define arcuate wireways through the elbow assembly.

14. The raceway assembly of claim 11 wherein said webs are offset thereby to overlap one another adjacent the corner of the wall structure that is less than square (90°).

15. The raceway assembly of claim 11 wherein said webs define a gap therebetween when provided at a corner that is in excess of square (90°), and at least one radiused insert provided on said webs to define arcuate wireway through the elbow assembly.

* * * * *